United States Patent
Chowdhury et al.

(10) Patent No.: US 10,075,257 B2
(45) Date of Patent: Sep. 11, 2018

(54) OPTICAL SPATIAL DIVISION MULTIPLEXING USABLE AT SHORT REACH

(71) Applicant: Alcatel-Lucent USA Inc., Murray Hill, NJ (US)

(72) Inventors: Aref Chowdhury, Berkeley Heights, NJ (US); Roland Ryf, Aberdeen, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 0 days.

(21) Appl. No.: 14/992,981

(22) Filed: Jan. 11, 2016

(65) Prior Publication Data
US 2017/0201341 A1    Jul. 13, 2017

(51) Int. Cl.
| | |
|---|---|
| H04J 14/04 | (2006.01) |
| H04B 10/2581 | (2013.01) |
| H04J 14/00 | (2006.01) |
| H04J 14/06 | (2006.01) |
| H04J 14/02 | (2006.01) |

(52) U.S. Cl.
CPC .......... *H04J 14/04* (2013.01); *H04B 10/2581* (2013.01); *H04J 14/00* (2013.01); *H04J 14/06* (2013.01); *H04J 14/02* (2013.01)

(58) Field of Classification Search
CPC .............................. H04J 14/04; H04B 10/2581
See application file for complete search history.

(56) References Cited

U.S. PATENT DOCUMENTS

| | | |
|---|---|---|
| 6,695,493 B2 | 2/2004 | Ciemiewcz |
| 6,720,830 B2 | 4/2004 | Andreou et al. |
| 6,829,286 B1 | 12/2004 | Guilfoyle et al. |

(Continued)

FOREIGN PATENT DOCUMENTS

| | | |
|---|---|---|
| WO | 2004019179 A2 | 3/2004 |
| WO | 2004093270 A2 | 10/2004 |

(Continued)

OTHER PUBLICATIONS

Tian, Zhaobing et al., "850-nm VCSEL Transmission Over Standard Single-Mode Fiber Using Fiber Mode Filter," IEEE Photonics Technology Letters, vol. 24, No. 5, Mar. 1, 2012, pp. 368-370.

(Continued)

*Primary Examiner* — David Payne
*Assistant Examiner* — Casey Kretzer
(74) *Attorney, Agent, or Firm* — Nokia Technologies Oy

(57) ABSTRACT

An optical data transmitter includes vertical cavity surface-emitting lasers and an all-optical spatial mode multiplexer. Each vertical cavity surface-emitting laser is configured to output a data modulated optical carrier at a center wavelength of less than one micrometer. The all-optical spatial mode multiplexer has an optical output and optical inputs. Each vertical cavity surface-emitting lasers is optically connected to one or more of the optical inputs of the all-optical spatial mode multiplexer. The all-optical spatial mode multiplexer is configured to cause at least two of the vertical cavity surface-emitting lasers to excite linearly independent combinations of one or more optical spatial propagating modes of an optical fiber in response to the optical output being coupled to a near end of the optical fiber.

14 Claims, 3 Drawing Sheets

(56) References Cited

U.S. PATENT DOCUMENTS

| | | | |
|---|---|---|---|
| RE40,173 E | | 3/2008 | Zediker et al. |
| 8,320,769 B2 | | 11/2012 | Essiambre et al. |
| 8,755,118 B2 | | 6/2014 | Chang-Hasnain et al. |
| 9,766,405 B2 | | 9/2017 | Koonen |
| 2002/0012152 A1* | | 1/2002 | Agazzi ............... H03M 1/0624 398/202 |
| 2002/0060827 A1* | | 5/2002 | Agazzi ............ G11B 20/10009 398/158 |
| 2004/0047577 A1* | | 3/2004 | Wang ................ G02B 6/02214 385/125 |
| 2005/0201669 A1 | | 9/2005 | Welch et al. |
| 2008/0279229 A1 | | 11/2008 | Suzuki et al. |
| 2011/0280269 A1 | | 11/2011 | Chang-Hasnain et al. |
| 2012/0008656 A1* | | 1/2012 | Matsui ................. H01S 5/0021 372/38.02 |
| 2014/0153922 A1* | | 6/2014 | Ryf .................... H04B 10/2581 398/44 |
| 2014/0199065 A1* | | 7/2014 | Bratkovski ........ H04B 10/2581 398/44 |
| 2014/0199066 A1* | | 7/2014 | Martelli ............. H04B 10/2581 398/44 |
| 2014/0348511 A1 | | 11/2014 | Mutalik et al. |
| 2015/0188291 A1 | | 7/2015 | Tan et al. |
| 2015/0296278 A1* | | 10/2015 | Liu ..................... H04J 14/0267 398/50 |
| 2015/0331181 A1* | | 11/2015 | Chen ................. G02B 6/02004 385/124 |

FOREIGN PATENT DOCUMENTS

| | | | |
|---|---|---|---|
| WO | | 2014056508 A1 | 4/2014 |
| WO | WO 2014/056508 A1 | | 4/2014 |

OTHER PUBLICATIONS

Stach, Martin, "High-Performance Low-Cost Optical Link at 850 nm with Optimized Standard Singlemode Fiber and High-Speed Singlemode VCSEL," Annual Report 2004, Optoelectronics Department, University of Ulm, pp. 1-4.

Annual Report 1998 Department of Optoelectronics University of Ulm, www.uni-ulm.de, 1998 [retrieved on Dec. 7, 2015] Retrieved from the Internet: <URL: https://www.uni-ulm.de/fileadmin/website_uni_ulm/iui.inst.140/Jahresbericht/1998/ar1998.pdf> (104 pages).

Chen, Haoshuo et al., U.S. Appl. No. 14/992,760, filed Jan. 11, 2016, "Multi-Mode Vertical-Cavity Surface-Emitting Laser".

Saridis, George M. et al., "Survey and Evaluation of Space Division Multiplexing: From Technologies to Optical Networks", IEEE Communication Surveys & Tutorials, vol. 17, No. 4, Fourth Quarter 2015, pp. 2136-2156.

PCT International Search Report, PCT/US2017/012676, dated Apr. 19, 2017, 5 pages.

Fiber-optic Communication, From Wikipedia, The Free Encyclopedia, https://en.wikipedia.org/wiki/Fiber-optic_communication, Jun. 21, 2017, 13 pages.

Agrawal, Govind P., Nonlinear Fiber Optics, Second Edition, pp. vii-xviii and Chapter 1 and 2, Academic Press, 1995, 73 pages.

"Vertical Cavity Surface-emitting Lasers", in RP Photonics Encyclopedia, available online at: https://www.rp-photonics.com/vertical_cavity_surface_emitting_lasers.html?s=ak, seems to have been published in 2008 by Wiley-VCH, 3 pgs.

Kuchta, D.M. et al., "A 55Gb/s Directly Modulated 850nm VCSEL-Based Optical Link", IEEE Photonics Conference 2012 (IPC 2012), Post Deadline Paper PD 1.5, 2 pgs.

Rylyakov, A. V. et al., "A 40-Gb/s, 850-nm, VCSEL-Based Full Optical Link", from Optical Fiber Communication Conference and Exposition (OFC/NFOEC), 2012 and the National Fiber Optic Engineers Conference, 2012, 3 pgs.

Massa, Nick, "Fiber Optic Telecommunication", Fundamentals of Photonics, Module 1.8, 2000, University of Connecticut, pp. 293-347.

Fiber-Optic Communication—Wikipedia, "Fiber-optic communication", Dec. 22, 2015, 14 pages.

"What is telecom optical wavelength bands?", 2 pages, available online at https://www.fiberlabs-inc.com/about-optical-communication-band/ (Publication Date unknown, applicant assumes published prior to filing date of current application).

Laurent Gasca, "From O to L: The Future of Optical-Wavelength Bands", available online at: www.broadbandproperties.com, Jun. 2008, pp. 83-85.

Fiber Optic Cabling Solutions, "Understanding Wavelengths in Fiber Optics", 3 pages, available online at: http://www.cables-solutions.com/understanding-wavelengths-in-fiber-optics.html (Publication Date unknown, applicant assumes published prior to filing date of current application).

Hayes, Jim, "The Fiber Optic Association—Tech Topics, Understanding Wavelengths In Fiber Optics", 2002, 3 pages, available online at: www.thefoa.org/tech/wavelength.htm.

Gilbert, Sarah L et al., "Wavelength standards for optical communications", Proceedings of SPIE, vol. 4269, 2001, pp. 184-191.

* cited by examiner

52 — OPERATE A PLURALITY OF VERTICAL CAVITY SURFACE-EMITTING LASERS TO OUTPUT OPTICAL CARRIERS CARRYING CORRESPONDING DIGITAL DATA STREAMS, WHEREIN EACH OPTICAL CARRIER HAS A CENTER WAVELENGTH OF LESS THAN 1.0 MICROMETERS

54 — ALL-OPTICALLY MULTIPLEX THE DATA MODULATED OPTICAL CARRIERS ONTO A PLURALITY OF OPTICAL SPATIAL PROPAGATION MODES OF AN OPTICAL TRANSMISSION FIBER AT A NEAR END OF THE OPTICAL TRANSMISSION FIBER, SUCH THAT AT LEAST TWO OF THE DATA MODULATED OPTICAL CARRIERS EXCITE LINEARLY INDEPENDENT COMBINATIONS OF THE OPTICAL SPATIAL PROPAGATING MODES

62 — ALL-OPTICALLY DEMULTIPLEX LIGHT OF WAVELENGTH LESS THAN 1.0 MICROMETER TO DIFFERENT OPTICAL PORTS BASED ON OPTICAL SPATIAL PROPAGATING MODE OF THE LIGHT AT A NEAR END OF AN OPTICAL TRANSMISSION FIBER IN RESPONSE TO RECEIVING THE LIGHT FROM THE OPTICAL TRANSMISSION FIBER

64 — DEMODULATE A SEPARATE STREAM OF DIGITAL DATA VALUES FROM THE DEMULTIPLEXED LIGHT AT EACH OF THE OPTICAL PORTS BY PRODUCING AN ELECTRICAL MEASUREMENT OF A LIGHT INTENSITY AT EACH OF THE OPTICAL PORTS AND TEMPORALLY SAMPLE THE ELECTRICAL MEASUREMENTS TO PRODUCE CORRESPONDING STREAMS OF DIGITAL DATA VALUES

OPTICAL SPATIAL DIVISION MULTIPLEXING USABLE AT SHORT REACH

BACKGROUND

Technical Field

The inventions relate to apparatus and methods for optical fiber communications.

Related Art

This section introduces aspects that may be helpful to facilitating a better understanding of the inventions. Accordingly, the statements of this section are to be read in this light and are not to be understood as admissions about what is in the prior art or what is not in the prior art.

The technique of optical spatial division multiplexing involves transmitted data over an optical fiber line with a plurality of optical spatial propagating modes. In optical spatial division multiplexing, at least, two of the optical spatial propagating modes have different phase and/or intensity profiles lateral to the propagation direction and may carry different data.

Presently, interest has been generated in optical spatial division multiplexing systems for optical transport networks. Optical transport networks usually operate in optical communication bands between about 1.5 micrometers and about 1.7 micrometers or near 1.3 micrometer. In these wavelength bands, conventional glass optical fibers have low attenuation or loss. Such optical transport networks often use edge emitting laser chips, which provide narrow band light emission. Such optical transport networks often use costly optical components and costly data processing components, e.g., to compensate for chromatic dispersion, inter-channel and/or intra-channel interference, noise, nonlinear optical distortions, and/or optical loss.

SUMMARY OF SOME EXAMPLES OF EMBODIMENTS

Some embodiments provide an optical data communication components and/or systems that are adapted for use at short reach, e.g., inside a data center and/or between nearby data centers. For example, in a data center, the optical data communication systems may provide optical data communications between different servers, between servers and top of rack switches (TORSs), between TORSs, between TORSs and other switches, between switches, between switches and routers, or more generally between data management devices of a data center. Such embodiments may provide for low cost and/or high bandwidth data communications over short optical transmission distances.

In first embodiments, an apparatus includes an optical data transmitter. The optical data transmitter includes a plurality of vertical cavity surface-emitting lasers and an all-optical spatial mode multiplexer. Each of the plurality of vertical cavity surface-emitting lasers is configured to output a data modulated optical carrier at a center wavelength of less than one micrometer. The all-optical spatial mode multiplexer has an optical output and a plurality of optical inputs. Each of the vertical cavity surface-emitting lasers is optically connected to one or more of the optical inputs of the all-optical spatial mode multiplexer. The all-optical spatial mode multiplexer is configured to cause at least two of the vertical cavity surface-emitting lasers to excite linearly independent combinations of one or more optical spatial propagating modes of an optical fiber in response to the optical output being coupled to a near end of the optical fiber.

In some examples of any first embodiments, the apparatus may further include a plurality of electrical drivers connected to directly modulate corresponding ones of the vertical cavity surface-emitting lasers.

In some examples of any first embodiments, different ones of the combinations may be relatively orthogonal.

In some examples of any first embodiments, some of the vertical cavity surface-emitting lasers may be configured to emit a light beam at a wavelength between 0.90 micrometers and 0.70 micrometers.

In some examples of any first embodiments, the apparatus may further include the optical fiber. The optical fiber may be, for example, a standard single mode optical fiber at wavelengths in the optical telecommunication C-band. The optical fiber may have, for example, a length of less than ten kilometers or even less than two kilometers and/or may be, for example, a single mode optical fiber for light having a wavelength of 1.550 micrometers. In some examples of this paragraph, the apparatus may further include an optical data receiver having another all-optical spatial mode multiplexer. The other all-optical spatial mode multiplexer has a plurality of optical inputs and has an optical output connected to receive light from an opposite end of the optical fiber. In some examples, the optical data receiver is connected to receive the light from the optical data transmitter without optical amplification of said light.

In some examples of any first embodiments, the plurality of vertical cavity surface-emitting lasers may be configured to emit light at about a same center wavelength.

In some examples of any first embodiments, the optical data transmitter may be configured to optically multiplex at least two of the data modulated optical carriers on relatively orthogonal polarizations of a same one of the combinations.

In second embodiments, a method includes operating a plurality of vertical cavity surface-emitting lasers to output optical carriers carrying corresponding digital data streams. Each optical carrier has a center wavelength of less than 1.0 micrometers. The method also includes all-optically multiplexing the data modulated optical carriers onto a plurality of optical spatial propagation modes of an optical transmission fiber at a near end of the optical transmission fiber. The multiplexing causes, at least, two of the data modulated optical carriers to excite linearly independent combinations of the optical spatial propagating modes of the optical transmission fiber.

In some examples of the second embodiments, the optical carriers may have about a same center optical wavelength.

In some examples of any of the second embodiments, each center wavelength may be between about 0.70 and 0.90 micrometers.

In third embodiments, a method includes in response to receiving light of wavelength less than 1.0 micrometers from an optical transmission fiber, all-optically demultiplexing the light to different optical ports based on optical spatial propagating mode of the light at a near end of the optical transmission fiber. The method also includes demodulating a separate stream of digital data values from the demultiplexed light at each of the optical ports by producing an electrical measurement of light intensity at each of the optical ports and temporally sampling the electrical measurements to produce corresponding streams of digital data values.

In some examples of the third embodiments, the optical transmission fiber may be a single mode optical fiber for light with a wavelength in the optical telecommunication C-band.

In some examples of any of the third embodiments, the received light may have been produced by direct modulating a plurality of vertical cavity surface-emitting lasers in parallel.

In some examples of any of the third embodiments, the received light may have been transmitted from an optical data transmitter located less than ten kilometers or even less than two kilometers from an optical spatial mode demultiplexer used to perform the demultiplexing.

BRIEF DESCRIPTION OF THE DRAWINGS

FIG. 4 is a flow chart schematically illustrating a method of transmitting data via optical spatial division multiplexing, e.g., in the optical data transmitter of FIG. 2;

FIG. 5 is a flow chart schematically illustrating a method of receiving data via optical spatial division multiplexing, e.g., in the optical data receiver of FIG. 3;

In the Figures and text like reference numbers refer to functionally and/or structurally similar elements.

In the Figures, the relative dimensions of some features may be exaggerated to more clearly illustrate apparatus therein.

Herein, various embodiments are described more fully by the Figures and the Detailed Description of Illustrative Embodiments. Nevertheless, the inventions may be embodied in various forms and are not limited to the specific embodiments described in the Figures and the Detailed Description of the Illustrative Embodiments.

DETAILED DESCRIPTION OF ILLUSTRATIVE EMBODIMENTS

The U.S. Patent Application titled "MULTIMODE VERTICAL-CAVITY SURFACE-EMITTING LASER" of inventors Haoshuo Chen, Nicolas Fontaine, and Roland Ryf, Ser. No. 14/992,760 (herein referred to as the CHEN application) is being filed on the same day as the present application and is incorporated herein by reference in its entirety. The CHEN application describes vertical cavity surface-emitting lasers (VCSELs) that may be used for some embodiments of the VCSELs described in the present application.

Herein, an all-optical device refers to a device that processes an optical signal without an intermediate conversion of the optical signal into one or more electrical signals and a re-conversion of the one or more electrical signals into another optical signal.

Figure 1A:
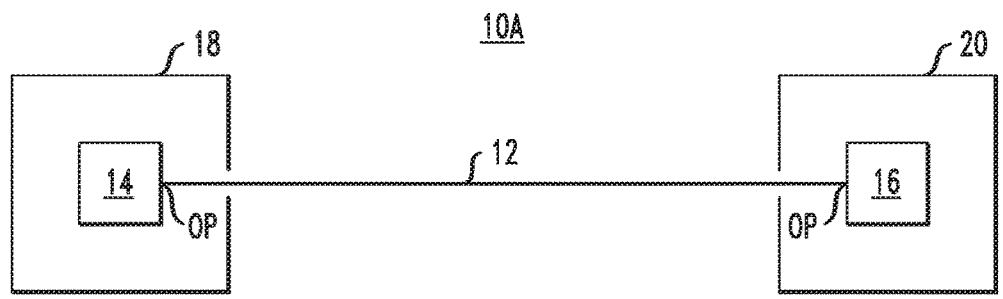
FIGS. 1A and 1B are block diagrams schematically illustrating alternate optical data communication systems that use a single optical transmission fiber to provide respective unidirectional and bidirectional optical data communication based on optical spatial division multiplexing.
Figure 1B:
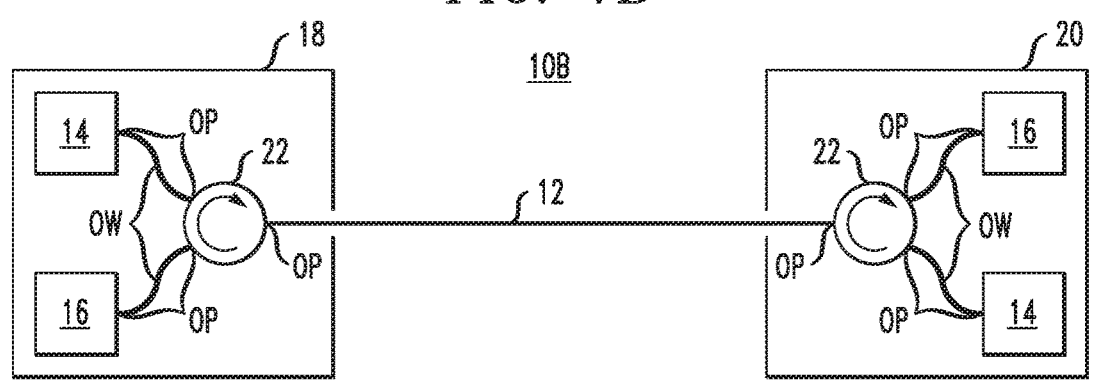
Figure 1C:
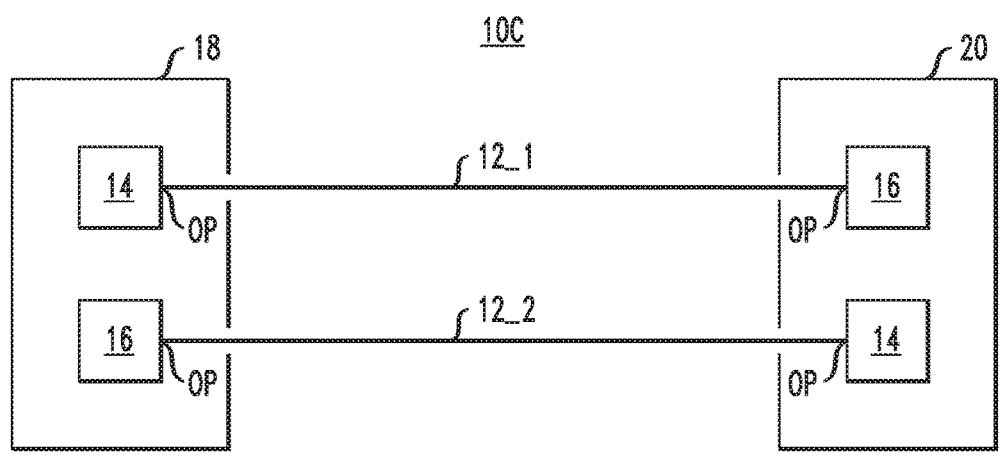
FIG. 1C is a block diagram schematically illustrating an optical data communication system that uses a pair of optical fibers to provide bidirectional optical data communication based on optical spatial division multiplexing.

FIGS. 1A, 1B, and 1C illustrate alternative optical data communication systems 10A, 10B, and 10C that perform optical spatial division multiplexing for the optical communication of data. Each optical data communication system 10A, 10B, 10C includes one or more optical data transmitters 14 and one or more optical data receivers 16 and is configured to support unidirectional or bidirectional optical data communication between two nodes 18, 20.

In some embodiments, the optical data communication systems may also perform polarization mode multiplexing so that different data streams are carried by orthogonal polarization states of the same optical spatial propagation mode of the optical transmission fiber line. In such embodiments, one or more communicating pairs of one optical data transmitter 14 and one optical data receiver 16 may be configured to handle optical signals that are both optical spatial multiplexed and optical polarization division multiplexed thereby enabling a substantially higher data communication rate.

The inventors believe that advantageous some embodiments of the optical data communication systems 10A-10C may be advantageously configured for short reach optical communications. For example, such embodiments would use optical transmission fiber lines whose lengths are less than 10 kilometers, typically less than 2 kilometers, possibly less than 1 kilometer, possibly even less than 500 meters, or even less than 100 meters or less than 10 meters in some cases. Such optical data communication systems would typically have optical transmission fiber lines with lengths of, at least, about 1 meter or, at least, about 2 meters, possibly, at least, about 10 meters, or even, at least, about 100 meters. For such short reach of the optical data communications, such embodiments are believed to enable the provision of high end-to-end data rates at low cost, e.g., sometime without need for one or more of wavelength division multiplexing, in-line optical amplification, optical dispersion compensation, and/or optical group velocity delay compensation.

Referring to FIG. 1A, the optical data communication system 10A has a single optical transmission fiber 12 configured for unidirectional optical data communications between the nodes 18, 20. In this embodiment, the node 18 typically has one of the one or more optical data transmitters 14, and the node 20 has one of the one or more data optical receivers 16. The optical data transmitter 14 and receiver 16 optically couple to opposite ends of the optical transmission fiber 12 via optical ports OP.

Referring to FIG. 1B, the optical data communication system 10B has a single optical transmission fiber 12 configured for bidirectional optical data communications between the nodes 18, 20. In this embodiment, each node 18, 20 includes one of the one or more optical transmitters 14, one of the one or more optical receivers 16 and a 3-port optical connector 22. The 3-port optical connector 22 redirects received optical data communications in appropriate directions. The 3-port optical connector 22 redirects optical signals from the optical data transmitter 14 of the same node 18, 20 to the optical transmission fiber 12 and redirects the optical signals from the optical transmission fiber 12 to the optical data receiver 16 of the same node 18, 20. The 3-port optical connector 22 may be, e.g., a conventional 3-port optical circulator. The optical data transmitters 14 and optical data receivers 16 have optical ports OP that optically connect to optical ports of the 3-port optical connector 22, e.g., via optical waveguides OW and/or other conventional optical components, e.g., lens(es), mirror(s), free space etc.

Referring to FIG. 1C, the optical data communication system 10C has a pair of optical transmission fibers 12_1, 12_2 and is configured for bidirectional optical data communications between the nodes 18, 20. In this embodiment, each node 18, 20 includes one of the one or more optical data transmitters 14 and one of the one or more optical data receivers 16. Also, each of the optical transmission fibers 12_1, 12_2 optically connects the optical port OP of the optical transmitter 14 of one of the nodes 18, 20 to the optical port OP of the optical receiver 16 of the other of the nodes 20, 18 in a manner that supports unidirectional communications between the pair of nodes 18, 20. The two optical transmission fibers 12_1, 12_2 support optical data communications, in opposite directions between the two nodes 18, 20.

Referring to FIGS. 1A-1C, optical data communication systems 10A-1C are typically configured to optically communicate data at wavelength(s) of less than 1.0 micrometer. For example, the optical data communications may be at wavelength(s) between about 0.90 micrometers and 0.70 micrometers, and may be at wavelengths near 0.98 micrometers, near 0.85 micrometers, or near 0.78 micrometers, i.e., output wavelengths for which low cost vertical cavity surface-emitting lasers (VCSELs) seem to be commercially available. At such short wavelengths, the optical transmission fibers 12, 12_1, 12_2 may be, e.g., standard multimode optical fibers (SMMFs) of the optical telecommunications C-band or may even be standard single mode optical fibers (SSMFs) of the optical telecommunications C-band. The optical telecommunications C-band includes wavelengths in the range of 1.530 micrometers to 1.565 micrometers. In particular, such SSMFs can function as multimode optical fibers, i.e., few mode optical fibers, at short wavelengths where the optical data communication systems 10A-1C operate.

Typically, the optical transmission fibers 12, 12_1, 12_2 support, at least, 3 relatively orthogonal, optical spatial propagating modes and also, often 2 orthogonal polarization states of each such optical spatial propagating mode at the short wavelengths used by the optical data communication systems 10A-10C. For example, the optical transmission fibers 12, 12_1, 12_2 may support a fundamental propagating mode of zero angular momentum and a pair of higher propagating modes with angular momenta of +1 and −1, respectively. The optical transmission fibers 12, 12_1, 12_2 may even support a larger set of relatively orthogonal, spatial propagating modes, e.g., also having angular momenta of magnitude greater than one. For example, some SSMFs may support more distinct optical spatial propagating modes, e.g., modes with angular momenta of larger magnitude, at shorter wavelengths in the range of 0.70 micrometers to 0.80 micrometers than at a wavelength near 1.00 micrometers.

Since the optical data communication systems 10A, 10B, 10C typically optically transmit data at wavelength(s) below 1.0 micrometers, the optical transmission fibers 12, 12_1, 12_2 typically produce substantial or even large optical losses. Thus, optical data communications are not typically possible at distances above about 10-80 kilometers and may not be possible even at distances greater than 10 kilometers or even at distances greater than about 2 kilometers. Indeed, embodiments of the systems 10A, 10B, 10C are typically made to support short reach, optical communications over the optical transmission fibers 12, 12_1, 12_2. In such short reach applications, the nodes 18, 20 may be less than 10 kilometers apart, less than or equal to 2 kilometers apart, less than or equal to 1 kilometer apart or even may be less than about 500 meters apart, e.g., inside a single data center. Thus, the optical transmission fibers 12, 12_1, 12_2 typically have total lengths of less than or equal to 10 kilometers, less than or equal to 2 kilometers, less than or equal to one kilometer, or even less than or equal to 500 meters.

Due to such short reach, optical the systems 10A, 10B, 10C typically can avoid the use one or more of in-line optical amplification, optical dispersion compensation, and/or compensation for nonlinear optical transmission effects. At such short reach, optical the systems 10A, 10B, 10C may also have a significantly lower need to compensate group delays between the different optical spatial propagating modes at the optical data transmitter 12 and/or the optical data receiver 14. Thus, even if different optical spatial propagating modes mix in the optical transmission fibers 12, 12_1, 12_2, such mixing typically does not involve portions of optical propagating modes with large relative group delays. For this reason, it is expected that multiple-input-multiple-output processing to recover data streams carried on different ones of the optical propagating modes or to pre-compensate data streams carried on different ones of the optical propagating modes can be simpler or absent in the optical data communication systems 10A, 10B, 10C. For example, inter-mode interference or mixing may be correctable via simple equalization in the optical data receiver 16. For the above-described reasons, some embodiments of the systems 10A, 10B, 10C can provide high capacity, optical, data communication systems at low cost.

In some embodiments, the optical transmission fibers 12, 12_1, 12_2 may also be, e.g., standard multimode fibers (SMFs) of the optical telecommunications C-band, e.g., at wavelengths of 1.530 to 1.565 micrometers.

Figure 2:
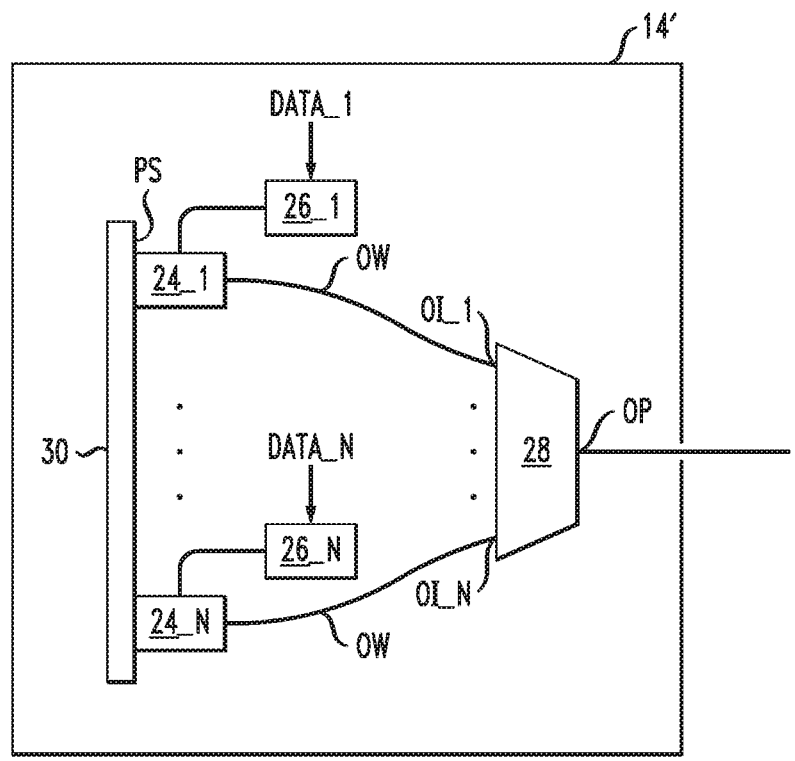
FIG. 2 is a block diagram schematically illustrating an optical data transmitter, e.g., that may be used in the optical data communication systems of FIGS. 1A-1C.

FIG. 2 schematically illustrates an embodiment 14' of the optical data transmitter 14, which is present in one or both of the nodes 18, 20 of FIGS. 1A-1C. The optical data transmitter 14' includes N optical sources 24_1 . . . 24_N, N corresponding electrical drivers 26_1 . . . 26_N, and an all-optical spatial mode multiplexer 28.

Each optical source 24_1-24_N is a vertical cavity surface-emitting laser (VCSEL). The different VCSELs 24_1-24_N may be configured to operate, e.g., at about the same center wavelength, e.g., less than or equal to 1.0 micrometers or even in the range of 0.7 micrometers to 0.9 micrometers. For example, the VCSELs 24_1-24_N may even output light at a center wavelength suitable for pumping conventional erbium doped optical fiber amplifiers for use in C-band optical telecommunications or may even output light at a shorter center wavelength, e.g., a wavelength between 0.80 and 0.70 micrometers, which is suitable for pumping other conventional lasers. The VCSELs 24_1-24_N may be fabricated, e.g., on a planar surface PS of the same substrate 30.

Each electrical driver 26_1 . . . 26_N is connected and configured to electrically control a corresponding one of the VCSELs 24_1-24_N to emit a data modulated optical carrier according to an amplitude modulation scheme, e.g., an ON/OFF modulation scheme or a modulation scheme with more amplitude values. The N electrical drivers 26_1-26_N may be located along the planar surface PS of the same substrate 30 as the N VCSELs 24_1-24_N or may be located on a different substrate (not shown).

In some embodiments, each electrical driver 26_1 . . . 26_N is configured to directly modulate the corresponding VCSEL 24_1-24_N to emit an optical carrier that is modulated to carry a corresponding digital data stream, i.e., DATA_1, . . . , or DATA_N. Here, DATA_1, . . . , and DATA_N are N independent digital data streams.

In other embodiments, each electrical driver 26_1 . . . 26_N may be configured to operate an external modulator (not shown) such that the corresponding VCSEL 24_1-24_N emits a modulated optical carrier carrying a corresponding one of the N digital data streams DATA_1, . . . , and DATA_N. In such embodiments, each electrical driver 26_1 . . . 26_N may electrically control, e.g., an electro-absorption modulator located at the optical output of the corresponding VCSEL 24_1-24_N.

The all-optical spatial mode multiplexer 28 has N optical inputs OI_1, . . . , OI_N that connect, e.g., via optical waveguides OW, to the optical outputs of the N M corresponding VCSELs 24_1-24_N. The all-optical spatial mode multiplexer 28 has an optical output that may be the optical port OP of the optical data transmitter 14' and thus, may optically connect to a near end or a near end face of an optical transmission fiber, e.g., one of the optical transmission fibers 12, 12_1, 12_2 of FIGS. 1A-1C. For example, the all-optical spatial mode multiplexer 28 may be a conventional photonic lantern type of optical spatial mode multiplexer, a conventional 3-dimensional optical waveguide type of spatial mode multiplexer, or a conventional free space apparatus for optical spatial division multiplexing, e.g., based on optical phase mask(s).

The all-optical spatial mode multiplexer 28 may configured to transmit light from each of the N optical inputs OI_1-OI_N into a nearby end face of an optical transmission fiber, e.g., optical transmission fibers 12, 12_1, 12_2 of FIGS. 1A-1C. In some embodiments, the all-optical spatial mode multiplexer 28 may be configured to primarily inject light from each of the N optical inputs OI_1-OI_N into a relatively orthogonal, one of the optical spatial propagating modes of the optical transmission fiber. In other embodiments, the all-optical spatial mode multiplexer 28 may be configured to inject light from one or more of the N optical inputs OI_1-OI_N into more than one of said relatively orthogonal, optical spatial propagating modes of the transmission optical fiber. In the various embodiments, all-optical spatial mode multiplexer 28 may be configured to inject light beams modulated with linearly independent digital data streams or linearly independent combinations of digital data streams onto relatively orthogonal, optical spatial propagating modes of the transmission optical fiber.

Figure 3:
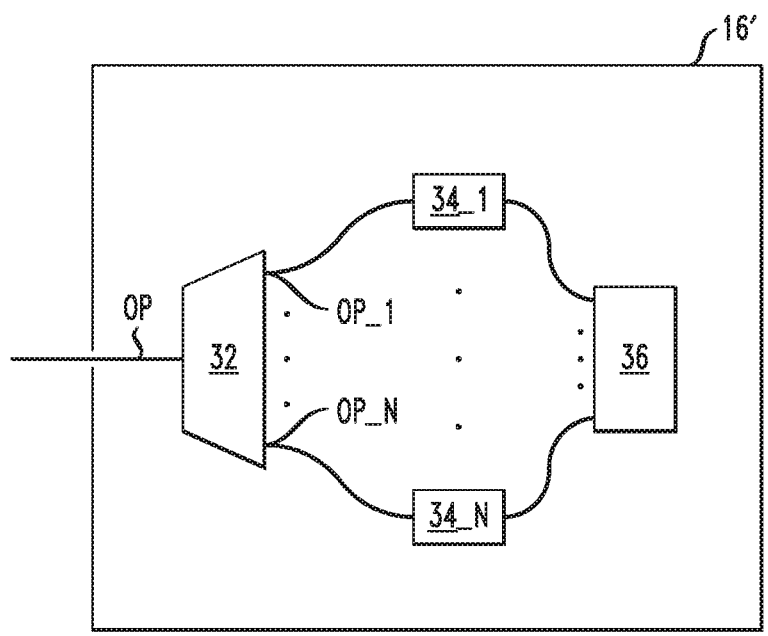
FIG. 3 is a block diagram schematically illustrating an optical data receiver, e.g., that may be used in the optical data communication systems of FIGS. 1A-1C.

FIG. 3 illustrates an embodiment 16' of the optical data receiver 16, which is present in one or both of the nodes 18, 20 of FIGS. 1A-1C. The optical data receiver 16' includes an all-optical spatial mode multiplexer 32; N light intensity detectors 34_1 . . . 34_N; and an electronic data processor 36 with N electrical inputs.

The all-optical spatial mode multiplexer 32 is connected to operate in reverse as an all-optical mode demultiplexer in the optical data receiver 16'. In particular, the single optical port of the all-optical spatial mode multiplexer 32 is the input optical port OP of the optical data receiver 16'. The array of N optical ports OP_1, . . . , OP_N of the all-optical spatial mode multiplexer 32 are connected to output light received from the input optical port OP of the optical data receiver 16'.

Each light intensity detector 34_1-34_N is optically connected to receive light from a corresponding one of the array of N optical ports of the all-optical spatial mode multiplexer 32. Each light intensity detector 34_1-24_N is electrically connected to output electrical signals to a corresponding electrical input of the electronic data processor 36.

The all-optical spatial mode multiplexer 32 is configured to separate light received at the optical port OP from the near end or near end face of the optical transmission fiber, e.g., the optical transmission fibers 12, 12_1, 12_2 of FIGS. 1A-1C, based on the optical spatial propagating modes of the light in the optical transmission fiber. In particular, different ones of the N optical ports OP_1-OP_N of the all-optical spatial mode multiplexer 32 either primarily or almost completely output light received from relatively orthogonal, optical spatial propagating modes of the optical transmission fiber connected to the optical port OP of the optical data receiver 16'.

In some embodiments, the all-optical spatial mode multiplexer 32 may also be configured to separate light of orthogonal polarizations of otherwise identical optical spatial propagating modes such that the light of relatively orthogonal polarizations is also primarily or possible almost completely directed to separate ones of the N optical ports OP_1-OP_N. In particular, such embodiments of the all-optical spatial mode multiplexer 32 may be used in the optical data communication systems 10A-10C of FIGS. 1A-1C that employ both optical spatial division multiplexing and optical polarization mode multiplexing to transmit data optically.

The light intensity detectors 36_1-36_N may include conventional diode or transistor light detectors. The light intensity detectors 36_1-36_N may or may not include electronic amplifiers connected to corresponding electrical outputs of the diode or transistor light detectors.

The electronic data processor 36 includes N conventional analog-to-digital converters connected the N corresponding to electrical inputs thereof and may include optional digital circuitry for processing of digital signal streams from the analog-to-digital converters. Each analog-to-digital converter outputs a temporally sampled stream of digital signals, e.g., that measures the digital data stream carried by one of the optical spatial propagating modes of the optical transmission fiber that is end-connected to the optical port OP of the optical data receiver 16'. The optional digital circuitry may provide for correction of transmission errors and/or compensate for some degradation of the optical signals, e.g., during transmission between corresponding paired optical data transmitter 14 and optical data receiver 16 of FIGS. 1A-1C. For example the optional digital circuitry may partially compensate or remove effects of chromatic dispersion and/or inter-optical-channel interference produced in the optical transmission fibers 12, 12_1, 12_2 used for optical fiber lines in FIGS. 1A-1C. Due to the short reach nature of such optical fibers 12, 12_1, 12_2, group velocity delay may, in some embodiments, be a small or insignificant problem in the optical data communication systems 10A-10C of FIGS. 1A-1C.

Referring again to FIGS. 1A-1C, some specific embodiments of the optical data communications systems 10A-10C may also support wavelength division multiplexing (WDM) over R WDM wavelength channels. In such an embodiment, the plurality of VCSELs 26_1-26_N of FIG. 3 may include R·P VCSELs, e.g., to support optical data communications on R WDM wavelength channels for each of P optical spatial modes, i.e., N=R·P. Also, the optical spatial mode multiplexer 28 may include an internal optical P×1 spatial mode multiplexer and P, R×1 WDM multiplexers connected to the P optical inputs of the internal optical P×1 spatial mode multiplexer. Then, R of the VCSELs 26_1-26_N may be connected to the corresponding R optical inputs of each of the R×1 WDM multiplexers. Also, the optical spatial mode multiplexer 32 of FIG. 4 may also include an internal optical P×1 spatial mode multiplexer and P, 1×R WDM demultiplexers connected to the P optical inputs of the internal optical P×1 spatial mode multiplexer. Then, R of the light intensity detectors 34_1-34_N may be connected to the R optical outputs of each 1×R WDM demultiplexer.

Such WDM embodiments may also support polarization division multiplexing to further increase the optical data capacity of the optical transmission fiber 12, 12_1, 12_2. Indeed, embodiments that support WDM and/or optical polarization multiplexing further increase the data capacity of the optical transmission fibers 12, 12_1, 12_2 of FIGS. 1A-1C.

FIG. 4 schematically illustrates a method 50 of transmitting data via optical spatial division multiplexing, e.g., using the optical data transmitter 14' of FIG. 2.

The method 50 includes operating a plurality of vertical cavity surface-emitting lasers (VCSELs) to output optical carriers carrying corresponding digital data streams, wherein each optical carrier has a center wavelength of less than 1.0 micrometers (step 52). In particular, each optical carrier is modulated to carry a different or independent digital data stream. Often, the modulating of digital data onto the optical carriers is performed, temporally in parallel, but some embodiments may perform the modulating in a temporally fully or partially serial manner. For example, the method 50 may involve alternating the selection, in time, of the optical carrier modulated by a stream of digital data.

In some embodiments of the operating step 52 may be, e.g., performed by direct electrical modulation of the individual VCSELs, e.g., in an ON/OFF manner. Such direct electrical modulation may use low cost apparatus to perform the operating step 52.

In other embodiments of the operating step 52 may be, e.g., performed by external modulation of the individual VCSELs, e.g., in an ON/OFF manner or in a manner supporting amplitude modulation with more than two values. For example, each VCSEL may be externally modulated by a corresponding electro-absorption modulator.

In some embodiments of the step 52, the individual optical carriers may, e.g., all be at about the same center optical wavelength.

In some embodiments of the step 52, each optical carrier may have, e.g., a center wavelength of between about 0.70 and about 0.90 micrometers, or even may have a center wavelength suitable for pumping optical telecommunication C-band, erbium doped, optical fiber amplifiers or a center wavelength suitable for pumping other conventional lasers. At such short wavelengths, e.g., about 0.70 micrometers to about 0.90 micrometers, lower cost VCSELs are believed to be readily available commercially.

The method 50 includes all-optically multiplexing the data modulated optical carriers onto a plurality of optical spatial propagating modes of an optical transmission fiber at a near end or end face thereof, e.g., the optical transmission fibers 12, 12_1, 12_2 of FIGS. 1A-1C (step 54). The multiplexing step 54 may use the all-optical spatial mode multiplexer 28 of FIG. 2 to perform the multiplexing.

The step 54 involves performing the multiplexing such that at least two of and possibly all of the data modulated optical carriers excite linearly independent combinations of the optical spatial propagating modes of the optical transmission fiber.

In some embodiments of the step 54, the multiplexing may also involve end-coupling different data modulated optical carriers to orthogonal polarization states of the same optical spatial propagating mode in the optical transmission fiber. In such embodiments, the method 50 involves performing both optical spatial division multiplexing and optical polarization mode division multiplexing of data, e.g., at the optical data transmitter 14' of FIG. 2 and in the optical data communication systems 10A-10C of FIGS. 1A-1C.

FIG. 5 schematically illustrates a method 60 of receiving data via optical spatial division multiplexing, e.g., using the optical data receiver 16' of FIG. 3.

The method 60 includes, in response to receiving light of wavelength less than 1.0 micrometers from a near end or a near end face of an optical transmission fiber, all-optically demultiplexing the light to different optical ports based on the optical spatial propagating modes of the light at the near end of the optical transmission fiber (step 62). The demultiplexing may be performed, e.g., such that, light received from, at last, first and second ones of optical spatial propagating modes is primarily or possibly even almost completely directed to different ones of the optical ports. The step 62 may use the all-optical 1×N spatial mode multiplexer 32 of FIG. 3 to demultiplex light received from a near end of any of the optical fibers 12, 12_1, 12_2 of FIGS. 1A-1C to different ones of the N optical ports OP_1-OP_N of FIG. 3.

In some embodiments of the step 62, the optical transmission fiber may be a single mode optical fiber for light with a wavelength in the optical telecommunication C-band.

In some embodiments of the step 62, the received light may have been produced by direct modulating a plurality of vertical cavity surface-emitting lasers in parallel.

In some embodiments of the step 62, the received light has been transmitted from an optical data transmitter located less than two kilometers, less than one kilometer, or even less than 500 meters from the optical spatial mode demultiplexer performing the demultiplexing.

In some embodiments, the demultiplexing step 62 may be performed on light with about the same central wavelength, e.g., without wavelength division (de)multiplexing.

The method 60 includes demodulating a separate stream of digital data values from the demultiplexed light output at each of the optical ports (step 64). The demodulating includes producing an electrical measurement of a light intensity at each of the optical ports and temporally sampling the electrical measurement to produce a stream of digital data values.

The light that the demultiplexing sends to different ones of the optical ports may carry linearly independent or different streams of digital data. The resulting plurality of digital signal streams may be further processed to compensate for some distortions, e.g., which are produced by transmission over an optical transmission fiber, e.g., distortions such as attenuation, chromatic dispersion and/or mixing of different optical spatial propagating modes in the optical transmission fiber.

In some embodiments, the demultiplexing step 62 is performed to direct, in parallel, light to the various ones of the optical ports, because the light is received from different optical spatial propagating modes of the optical transmission fiber at about the same time.

In other embodiments, the demultiplexing step 62 may be performed in a serial manner, because the optical spatial propagating mode from which light is received change in time.

In some embodiments, the demultiplexing step 62 may also include demultiplexing received light based on optical polarization. In such embodiments, light received from the relatively orthogonal polarization states of the same optical spatial propagating mode of the optical transmission fiber may be primarily or even substantially completely directed by the step 62 to different ones of the optical ports. In such embodiments, the method 60 may support optical data communication that includes both optical spatial division multiplexing and optical polarization mode division multiplexing, e.g., in the optical data receiver 16' of FIG. 2 and the optical data communication systems 10A-1C of FIGS. 1A-1C.

The Detailed Description of the Illustrative Embodiments and the Drawings merely illustrate principles of the invention. It will thus be appreciated that those skilled in the art will be able to devise various arrangements that, although not explicitly described or shown herein, embody principles of the inventions and are included within the claimed inventions. Also, all statements herein reciting principles, aspects, and embodiments of the inventions, as well as specific examples thereof, are intended to encompass equivalents thereof.

What is claimed is:

1. An apparatus, comprising:
   an optical data transmitter including
   a plurality of vertical cavity surface-emitting lasers, each of the plurality of vertical cavity surface-emitting lasers being configured to output a data modulated optical carrier at a center wavelength of less than one micrometer;
   an optical fiber being a single mode optical fiber at wavelengths in the optical telecommunication C-band;
   an all-optical spatial mode multiplexer having an optical output and a plurality of optical inputs, each of the vertical cavity surface-emitting lasers being optically connected to one or more of the optical inputs of the all-optical spatial mode multiplexer, a near end of the optical fiber being optically coupled to the optical output of the all-optical spatial mode multiplexer; and
   wherein the all-optical spatial mode multiplexer is configured to cause at least two of the vertical cavity surface-emitting lasers to excite linearly independent combinations of one or more optical spatial propagating modes of the optical fiber.

2. The apparatus of claim 1, further comprising a plurality of electrical drivers being connected to directly modulate corresponding ones of the vertical cavity surface-emitting lasers.

3. The apparatus of claim 1, wherein the different ones of the combinations are relatively orthogonal.

4. The apparatus of claim 1, wherein some of the vertical cavity surface-emitting lasers are configured to emit a light beam at a wavelength between 0.90 micrometers and 0.70 micrometers.

5. The apparatus of claim 1, further comprising an optical data receiver having another all-optical spatial mode multiplexer, the another all-optical spatial mode multiplexer having a plurality of optical inputs and having an optical output connected to receive light from an opposite end of the optical fiber.

6. The apparatus of claim 5, wherein the optical fiber has a length of less than two kilometers.

7. The apparatus of claim 5, wherein the optical data receiver is connected to receive light from the optical data transmitter without optical amplification of said light.

8. The apparatus of claim 5, wherein the optical fiber is a single mode optical fiber for light having a wavelength of 1.550 micrometers.

9. The apparatus of claim 5, wherein the optical data transmitter is at one data processing node of a data center and the optical data receiver is at a distant data processing node of the data center, the data processing nodes being connected to optically communicate data in a unidirectional or bidirectional manner.

10. The apparatus of claim 1, wherein the plurality of vertical cavity surface-emitting lasers are configured to emit light at about a same center wavelength.

11. The apparatus of claim 1, wherein the optical data transmitter is configured to optically multiplex at least two of the data modulated optical carriers on relatively orthogonal polarizations of a same one of the combinations.

12. A method, comprising:
    operating a plurality of vertical cavity surface-emitting lasers to output optical carriers carrying corresponding digital data streams, each optical carrier having a center wavelength of less than 1.0 micrometers;
    all-optically multiplexing the data modulated optical carriers onto a plurality of optical spatial propagating modes of an optical transmission fiber at a near end of the optical transmission fiber, the optical transmission fiber being a single mode optical fiber for light with a wavelength in the optical telecommunication C-band; and
    wherein the multiplexing causes, at least, two of the data modulated optical carriers to excite linearly independent combinations of one or more of the optical spatial propagating modes of the optical transmission fiber.

13. The method of claim 12, wherein the optical carriers have about a same center optical wavelength.

14. The method of claim 12, wherein each center wavelength is between about 0.70 and 0.90 micrometers.

* * * * *